(12) United States Patent
Li et al.

(10) Patent No.: US 10,200,197 B1
(45) Date of Patent: Feb. 5, 2019

(54) SCALABLE CRASH FAULT-TOLERANCE CONSENSUS PROTOCOL WITH EFFICIENT MESSAGE AGGREGATION

(71) Applicant: NEC Laboratories Europe GmbH, Heidelberg (DE)

(72) Inventors: Wenting Li, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/844,674

(22) Filed: Dec. 18, 2017

(51) Int. Cl.
*H04L 29/06* (2006.01)
*H04L 9/12* (2006.01)
*H04L 9/32* (2006.01)
*H04L 9/00* (2006.01)

(52) U.S. Cl.
CPC ............. *H04L 9/12* (2013.01); *H04L 9/008* (2013.01); *H04L 9/3242* (2013.01); *H04L 9/3247* (2013.01); *H04L 2209/38* (2013.01)

(58) Field of Classification Search
CPC ... H04L 9/12; H04L 9/30; H04L 9/008; H04L 9/3242; H04L 9/3247; H04L 9/3236; H04L 2209/38; H04L 2209/56; G06F 21/602
USPC ........................................................ 713/176
See application file for complete search history.

(56) References Cited

U.S. PATENT DOCUMENTS

| | | | | |
|---|---|---|---|---|
| 7,421,578 B1* | 9/2008 | Huang | ................. | H04L 63/065 370/254 |
| 2012/0254342 A1* | 10/2012 | Evans | ................. | G06F 11/186 709/214 |
| 2017/0141971 A1* | 5/2017 | Ainsworth | .......... | H04L 41/5054 |

OTHER PUBLICATIONS

Leslie Lamport, "Paxos Made Simple", Nov. 1, 2001, pp. 1-14.
Diego Ongaro, et al., "In search of an Understandable Consensus Algorithm", Proceedings of USENIX ATC '14: 2014 USENIX Annual Technical Conference, Jun. 19-20, 2014, pp. 1-16.

* cited by examiner

*Primary Examiner* — Yogesh Paliwal
(74) *Attorney, Agent, or Firm* — Leydig, Voit & Mayer, Ltd.

(57) ABSTRACT

Methods and systems for encrypting and aggregating data in a network are provided. The method includes performing synchronization, by a leader node. Synchronization includes the following steps: transmitting a prepare message, receiving a promise message, transmitting an accept message, and receiving an accepted message. The method further includes performing a steady state phase, by the leader node. The steady state phase includes the following steps: transmitting a second accept message and receiving a second accepted message.

15 Claims, 7 Drawing Sheets

SCALABLE CRASH FAULT-TOLERANCE CONSENSUS PROTOCOL WITH EFFICIENT MESSAGE AGGREGATION

FIELD

The present invention relates to a method and system for a scalable crash fault-tolerant (CFT) consensus protocol for large networks.

BACKGROUND

Blockchain technology provides a decentralized, open, Byzantine fault-tolerant transaction mechanism. Blockchain technology is becoming common for various types of Internet interactions, including anonymous online payments, remittance, and the transaction of digital assets.

There are numerous types of different open blockchains. Permission-based blockchains for various industrial use cases are also becoming common. Blockchains, including industrial blockchains, are a distributed system with strong consensus mechanisms that are scalable to support hundreds or thousands of nodes. However, industrial blockchain has more trust on the nodes then general blockchains. Therefore, industrial blockchains can assume the nodes to be crash-faulty only.

Crash fault-tolerance (CFT) protocols are used in distributed systems with unreliable communication channels to maintain consensus among the replicated servers. Cloud storage providers rely on crash fault-tolerant variants such as Paxos consensus algorithms and Raft consensus algorithms to guarantee data consistency for read/write operations. However, existing CFT protocols are only suitable for applications in relatively small networks, i.e., networks with no more than 20 nodes. Modern applications and systems using blockchain can effectively utilize large networks composed of thousands of nodes.

There are two primary challenges when applying conventional CFT protocols to blockchain networks. First, all existing CFT protocols are based on broadcasting channels using leader nodes. Therefore, the leader node can become a bottleneck for the network. Second, when using a CFT protocol, a secure and authenticated channel such as transport layer security (TLS) between any two nodes is assumed. As a result, the computation effort of a node increases with the number of connections to other nodes. This becomes especially burdensome in a relayed network, where the votes of nodes first need to be decrypted and encrypted again for the next relay.

SUMMARY

In one embodiment, a method for encrypting and aggregating data in a network is provided. The method includes performing synchronization, by a leader node. Synchronization includes the following steps: transmitting a prepare message, including a proposal number, the prepare message encrypted with a proposal key and signed by the leader node; receiving a promise message including the proposal number, an initiated instruction number, and a last accepted proposal if any from each follower node, the promise message encrypted with authenticated encryption; transmitting an accept message including the proposal number, the initiated instruction number, and the last accepted proposal, the accept message encrypted with the proposal key and signed by the leader node; and receiving an accepted message including a hash of the of the proposal number and the instruction number and an acknowledgement indicator encrypted with additive homomorphic cryptography. The method further includes performing a steady state phase, by the leader node. The steady state phase includes the following steps: transmitting a second accept message including the synchronized proposal number, a second incremented instruction number, and a transaction value from the request, the second accept message encrypted with the proposal key and signed by the leader node; and receiving a second accepted message including a hash of the of the synchronized proposal number, the second instruction number and an acknowledgment indicator encrypted with additive homomorphic cryptography.

In another embodiment, a leader node in a network comprising one or more processors which, alone or in combination, are configured to provide for performance of synchronization, by the leader node. Synchronization includes the following steps: transmitting a prepare message, including a proposal number, the prepare message encrypted with a proposal key and signed by the leader node; receiving a promise message including the proposal number, an initiated instruction number, and a last accepted proposal if any from each follower node, the promise message encrypted with authenticated encryption; transmitting an accept message including the proposal number, the initiated instruction number, and the last accepted proposal if any from each follower node, the accept message encrypted with the proposal key and signed by the leader node; and receiving an accepted message including a hash of the of the proposal number and the instruction number and an acknowledgement indicator encrypted with additive homomorphic cryptography. The one or more processors are further configured to provide for performance of a steady state phase. The steady state phase includes the following steps: transmitting a second accept message including the synchronized proposal number, a second incremented instruction number, and a transaction value from the request, the second accept message encrypted with the proposal key and signed by the leader node; and receiving a second accepted message including a hash of the of the synchronized proposal number, the second instruction number and an acknowledgment indicator encrypted with additive homomorphic cryptography.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A problem unique to computer networks and solved by embodiments of the present invention is to efficiently provide a scalable fault tolerant consensus protocol for large networks. Embodiments provide a scalable crash fault-tolerant (CFT) protocol for network. In some embodiments, the network is a blockchain network. A network topology can be either a tree or a super star. These configurations reduce the computational burden, including the network bandwidth, of the leader node. Rather than use a conventional secure channel such as transport layer security (TLS), embodiments provide an efficient message aggregation approach based on homomorphically encrypted data. As a result, authentication is only required among relaying nodes, while votes in the network can be directly aggregated without re-encryption. Moreover, as compared to existing CFT protocols which are only suitable for small networks, the scalable CFT protocol of embodiments of the present invention can be used in large networks, and in particular, block chain networks despite the challenges presented by such networks.

In an embodiment, an exemplary blockchain network contains n=2f+1 validation nodes to maintain the network consensus, assuming the system can tolerate f crash-faulty validation nodes. In addition to the communication channel, a validation node maintains a keystore that records the credentials for nodes in the network, a state machine that executes the instructions in the transaction messages, and a counter that tracks the latest instruction number. Transactions are broadcast in the network and the validation nodes follow the consensus algorithm to agree on the next transaction (or block of transactions) which will be included in a ledger. Each transaction (or block) has an increasing instruction number $I_k$ to indicate its executing order in the ledger, while the content of the transaction (or block) is denoted by $v_k$.

Figure 1:
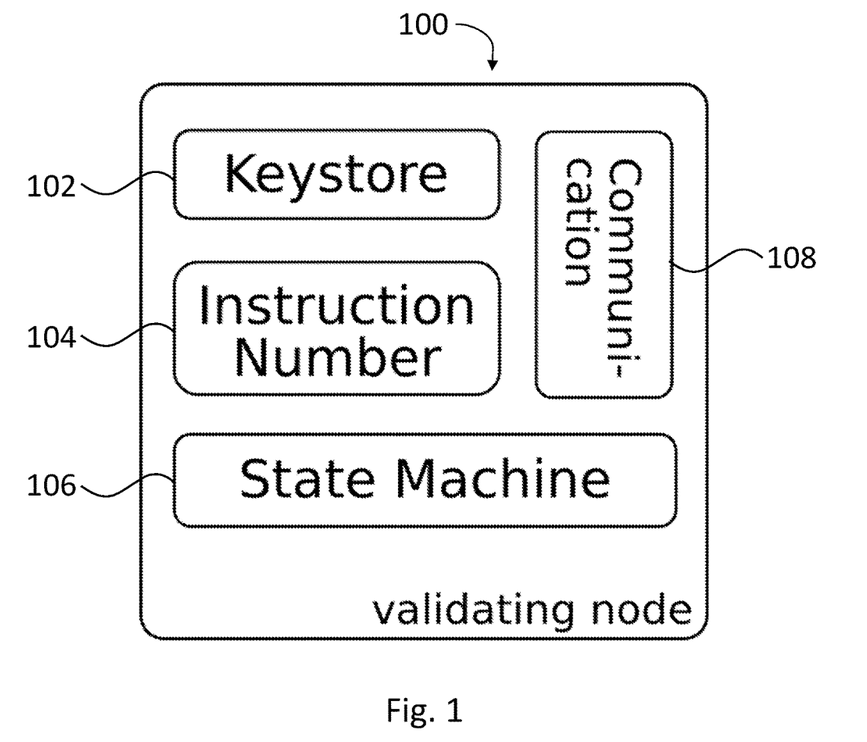
FIG. 1 illustrates a system diagram of a validation node according to an embodiment.

FIG. 1 illustrates a validation node 100. The validation node 100 includes a keystore 102. The keystore 102 stores credentials for each node in a network. An instruction number counter 104 is incremented for each instruction received in transaction messages by the same leader node. A state machine 106 executes the instructions in the transaction messages. Finally, a communications interface 108 connects the validation node 100 to the network. The communications interface 108 can be any suitable interface including, Ethernet, WiFi, and cellular. The network can be any suitable network, including the internet, local area network, and wide area network.

Figure 2:
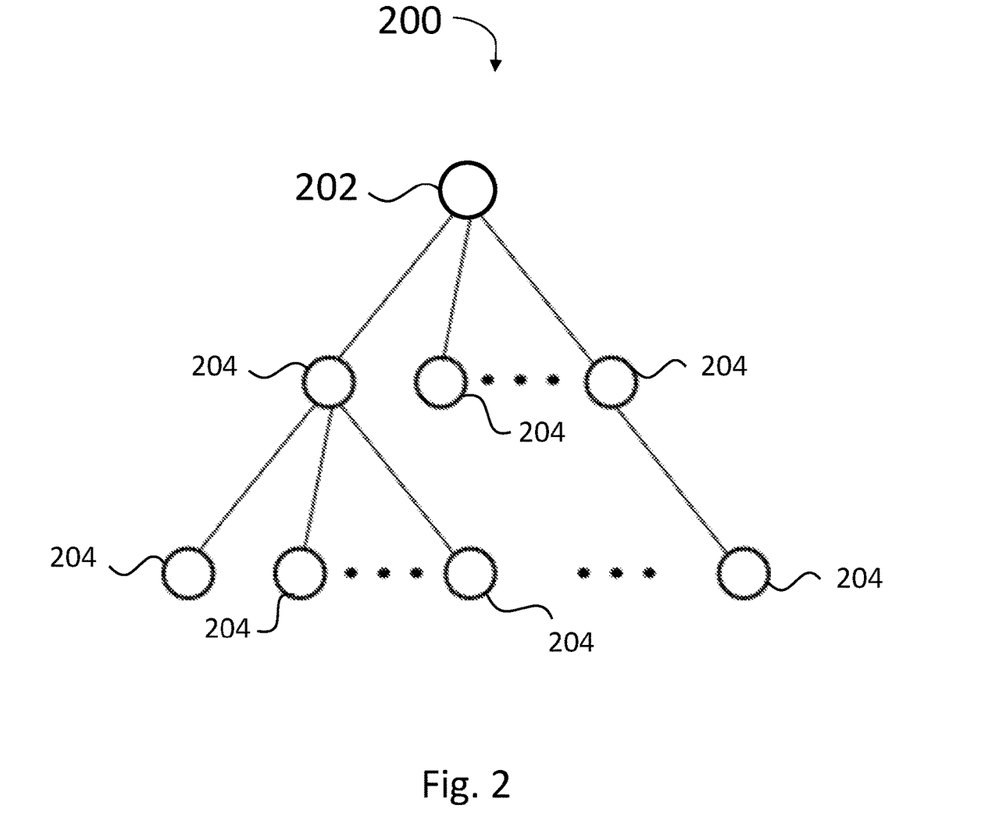
FIG. 2 illustrates a tree network topology according to an embodiment.

In some embodiments, the validation nodes (such as validation node 100) may be connected either following a tree topology or a super star topology. FIG. 2 illustrates a tree topology 200. In this embodiment, leader node 202 is a validation node. Leader nodes in a network tree are validation nodes, such as validation node 100. Each of the remaining nodes 204 form the tree. The nodes 204 are also referred to as follower nodes.

In this embodiment, for point-to-point connections, each validation node 202 shares pair-wise message authentication code (MAC) keys $k_{i,j}^{mac}$ for bi-directional authentication. There is only one validation node, as long as it does not crash or got isolated, that proposes messages and collects votes. If the validation node does crash or get isolated, the follower nodes will propose the network re-construct a new network tree with another leader node. Thus, the leader node 202 proposes messages and collects votes from follower nodes 204. In some embodiments, the leader node 202 has a pair of asymmetric keys (pk, sk) of an additive homomorphic cryptographic scheme and signing key pair ($pk_s,sk_s$) where the public key is known by all follower nodes 204. In addition, the leader node 202 also has a proposal key $k_{pr}$ that is shared by all nodes. In this embodiment, pk and $pk_s$ are public keys and sk and $sk_s$ are private keys.

In one embodiment, the nodes will synchronize for the last state with a prepare stage and an accept stage. The last state refers to the state of accepted transaction proposals, including the proposal number, the instruction number and the value of the instruction in the transaction. In the prepare stage, the leader node 202 sends a prepare message Prepare (n) to the follower nodes 204, where n is the proposal number. The proposal number must be greater than that of any previous Prepare messages proposed by the leader. The prepare message is encrypted with the proposal key $k_{pr}$ and signed by the leader node 202 with $sk_s$. In this way, the propagation of the prepare message does not need to follow a static network topology and can be forwarded from any node to avoid re-processing. However, only the leader node 202 is able to initiate the prepare message. In one embodiment, when a follower node 204 receives the Prepare message, it replies to the leader with a Promise message only if the received proposal number is higher than that of any previously promised messages. The promise message would repeat the proposal number n, initialize the instruction number (for the same leader) $I_0$, and would include the last accepted proposal $v_i$ if there is any. The promise message Promise($n,I_0,v_i$) follows the authenticated encryption procedure using the pair-wise session key $k_{i,j}^{mac}$.

In the accept stage, the leader node 202 derives the last accepted proposal value $v_0$ from the promises of the followers to be the value associated with the highest proposal number (first-key) and instruction number (second-key). The leader thus sends an accept message Accept($n,I_0,v_0$) to the follower nodes 204 so that they are synchronized. Similar to a prepare message, the accept message is encrypted with the proposal key $k_{pr}$ with the leader node's signature. To confirm that the message is accepted by the majority of the follower nodes, each follower node replies with a message Accepted($H(n,I_0),b_i$), where $b_i$ is 1 if node i accepted and 0 if rejected. Note that H(•) is hash function and only the hash of the proposal number and instruction number is sent, and b is encrypted with additive homomorphic cryptography (e.g., Paillier scheme) using key pk.

In addition, a MAC is added to the accepted message. When a node receives the accepted messages from the sub-nodes, they just need to verify and re-compute the MAC of the message, while the acknowledgement b can be summed up with the encrypted value as a result of the additive homomorphism of homomorphic cryptography. Finally, the leader node decrypts the sum of the votes and if the vote is the majority, the system is now ready to accept new instructions.

When the leader node 202 receives a new request, instruction ($I_k,w_k$) is proposed to the follower nodes 204 in an accept message Accept($n,I_k,w_k$), where the instruction number $I_k$ increments on each new request. Similar to the accept stage in the synchronization phase, the message is encrypted with the proposal key $k_{pr}$ with the leader's signature. Then if the followers accept the message, accepted message Accepted(H(n,$I_k$),b) is replied and aggregated in a similar way. Table 1 summarizes one embodiment of a scalable crash-fault tolerant protocol.

TABLE 1

| Phase | Sender | Message | Crypto |
|---|---|---|---|
| Synchronize (only once) | leader | Prepare(n) | $Enc_{k_{pr}}$, $Sig_{pk_s}$ |
| | follower$_i$ | Promise(n, $I_0$, $v_i$) | AuthenticatedEnc$_{k_{ij}}$ |
| | leader | Accept(n, $I_0$, $v_0$) | $Enc_{k_{pr}}$, $Sig_{pk}$ |
| | follower$_i$ | Accepted(H (n, $I_0$), $b_i$) | $Mac_{k_{ij}}$, $Enc_{pk}$ |
| Steady (multiple) | leader | Accept(n, $I_k$, $w_k$) | $Enc_{k_{pr}}$, $Sig_{pk_s}$ |
| | follower$_i$ | Accepted(H (n, $I_k$), $b_i$) | $Mac_{k_{ij}}$, $Enc_{pk}$ |

Figure 3:
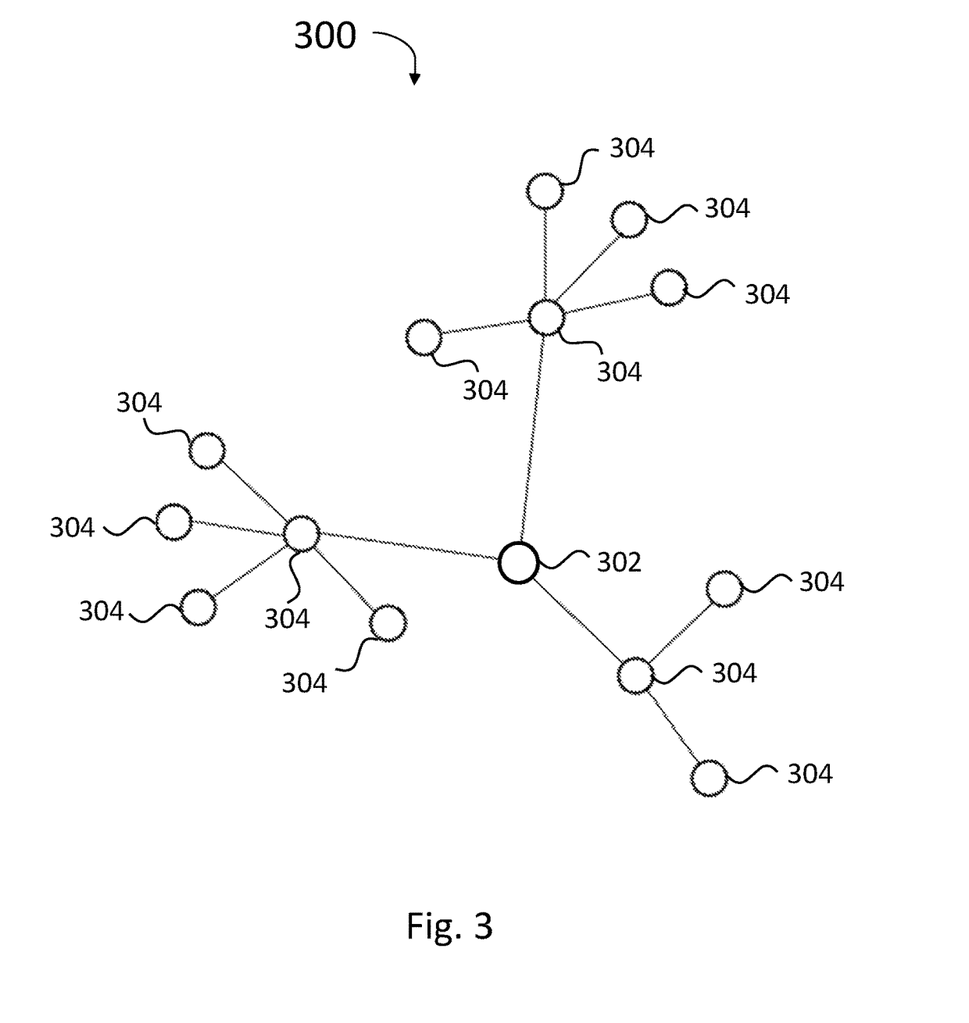
FIG. 3 illustrates a star network topology according to an embodiment.
Figure 4:
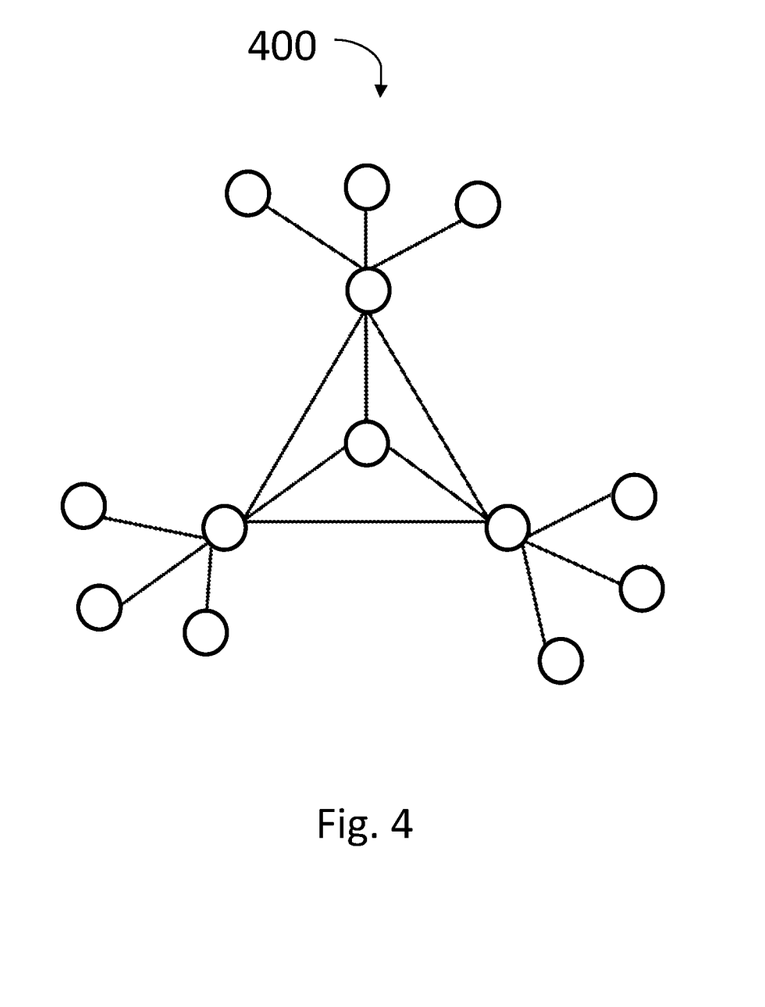
FIG. 4 illustrates a super peer network topology according to an embodiment.

Other network topologies can be used with the described scalable crash-fault tolerant protocol. For example, FIG. 3 illustrates a star topology 300. Leader node 302 connects to follower nodes 304. Similarly, FIG. 4 illustrates a super-peer architecture 400.

Figure 5:
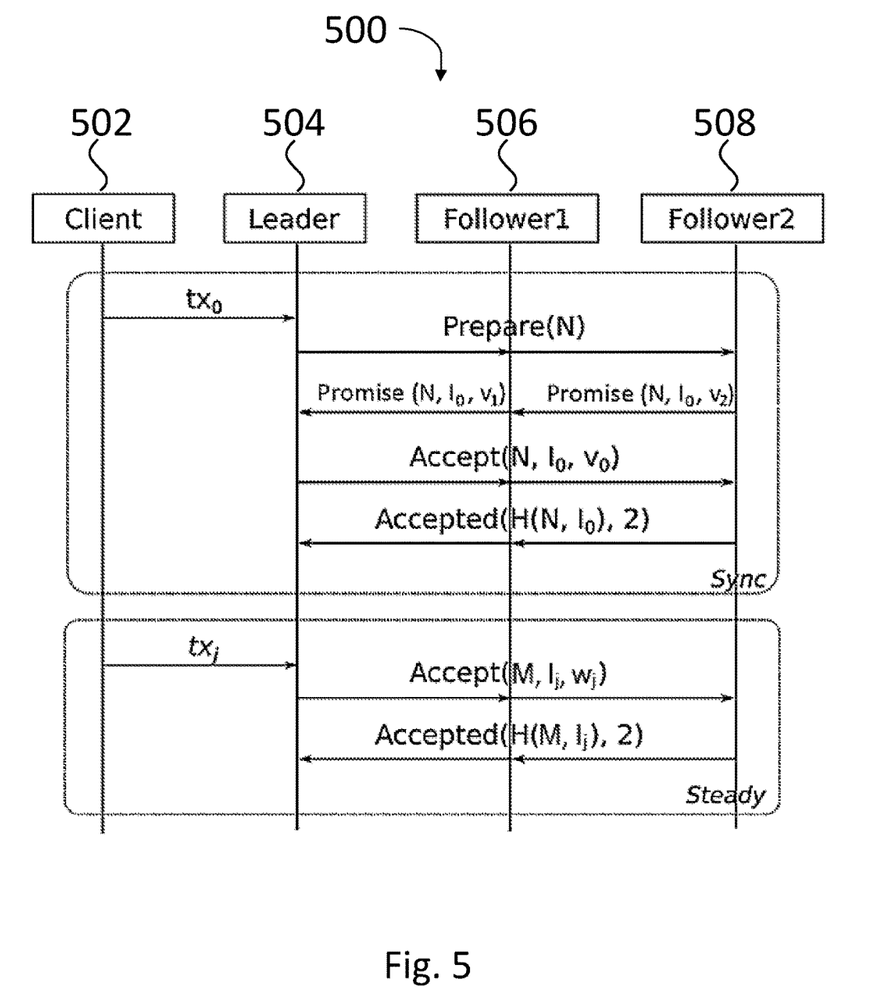
FIG. 5 is a sequence diagram showing a scalable crash-fault tolerant protocol according to one embodiment.

FIG. 5 is a sequence diagram showing a scalable crash-fault tolerant protocol according to one embodiment. The illustrated embodiment includes a client 502, one leader node 504 and two follower nodes 506 and 508. The client 502 initiates a transaction. However, as described above various network topologies are supported including various numbers of leader nodes and follower nodes.

At a time $tx_0$ synchronization of the nodes begins. The leader node 504 sends a prepare message, Prepare(n) to the follower nodes 506 and 508. As shown, follower node 506 may receive the prepare message and transmit it to the next follower node in the network, follower node 508.

After receiving the prepare message the follower nodes 506 and 508 transmit a promise message, Promise(n, $I_0$, $v_1$) and Promise(n,$I_0$,$v_2$) respectively to the leader node 504 if they did not promise any proposals with a higher proposal number than n. In this embodiment, n is the proposal number of the prepare messages. If the node has accepted a proposal before, then the accepted proposal $v_i$ from node i is also transmitted. As shown, follower node 506 may transmit the last accepted proposal $v_1$ in the promise message and follower node 508 ($v_2$) to the leader node 504.

After receiving the promise message, the leader node 504 derives the last accepted proposal $v_0$ ($v_0$=last of $\{v_1,v_2\}$) and transmits an accept message, to the follower nodes 506 and 508.

After the leader node 504 receives the promise message, the leader node 504 transmits an accept message Accept(n, $I_0$,$v_0$), to the follower nodes 506 and 508, where n is the proposal number for the prepare message, $I_0$ is the instruction number, and v is the last accepted proposal.

After receiving the accept message, the follower nodes 506 and 508 transmit an accepted message, Accepted(H(n, $I_0$),$b_i$) where n is the proposal number for the prepare message, $I_0$ is the instruction number, and the acknowledgement $b_i$ is 1 if node i accepted and 0 if rejected. In this case, $b_i$ is 2 because the acknowledgement b can be summed with the encrypted value of the sub node as a result of the additive homomorphism of homomorphic cryptography. After this process, the leader node 504 and follower nodes 606 and 508 are synchronized.

At a later time $tx_j$, the system is in a steady state. During this time, the leader node 504 transmits accept messages, Accept(m,$I_j$,$w_j$), where m is the proposal number in the steady phase, $I_j$ is the incremented instruction number at time $tx_j$, and $w_j$ is the value of the transaction at time $tx_j$. After receiving the accept message, the follower nodes 506 and 508 transmit an accepted message, Accepted(H(m,$I_j$),$b_j$)

where m is the proposal number in the steady phase, $I_j$ is the instruction number at time $tx_j$, and the acknowledgement $b_j$ is 1 if node i accepted and 0 if rejected. In this case, $b_i$ is 2 because the acknowledgement b can be summed with the encrypted value of the sub node as a result of the additive homomorphism of homomorphic cryptography. As discussed, each of the messages in FIG. 5 may be transmitted using the cryptography shown in table 1.

Figure 6:
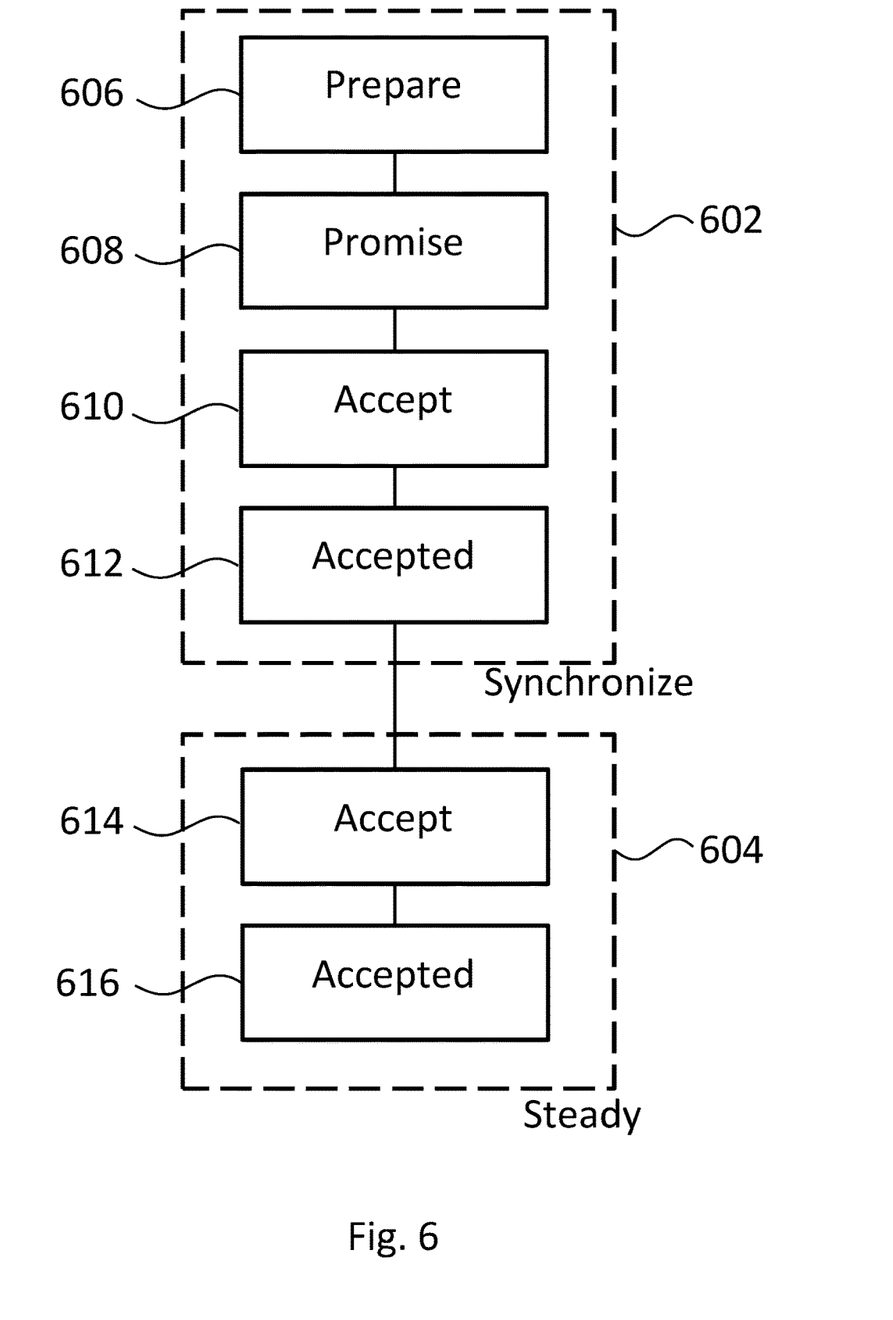
FIG. 6 is a flow illustrating a scalable crash fault tolerant consensus protocol according to one embodiment.

FIG. 6 is a flow illustrating a scalable crash fault tolerant consensus protocol according to one embodiment. Stage 602 illustrates the steps in the synchronization phase of the protocol. Stage 604 illustrates the steps in the steady state phase of the protocol.

At step 606, a leader node sends a prepare message. The prepare message is encrypted with the proposal key $k_{pr}$ and signed by the leader node with $sk_s$.

At step 608, the follower nodes receive the prepare message and send back to the leader node a promise message. The promise message follows the authenticated encryption routine.

At step 610, after receiving the promise message, the leader node transmits an accept message to the follower nodes. The accept message is encrypted with the proposal key $k_{pr}$ with the leader node's signature.

After receiving the accept message, at step 612 the follower nodes send back an accepted message. The accepted message is encrypted with additive homomorphic cryptography using key pk. Additionally, a MAC is added to the accepted message.

After the synchronization phase of the protocol is complete at stage 602, the protocol enters a steady state phase at stage 604. At step 614 the leader node transmits an accept message to the follower nodes. As described above, the accept message is encrypted with the proposal key $k_{pr}$ with the leader node's signature.

After receiving the accept message, at step 616 the follower nodes send back an accepted message. The accepted message is encrypted with additive homomorphic cryptography using key pk and a MAC is added to the accepted message.

Figure 7:
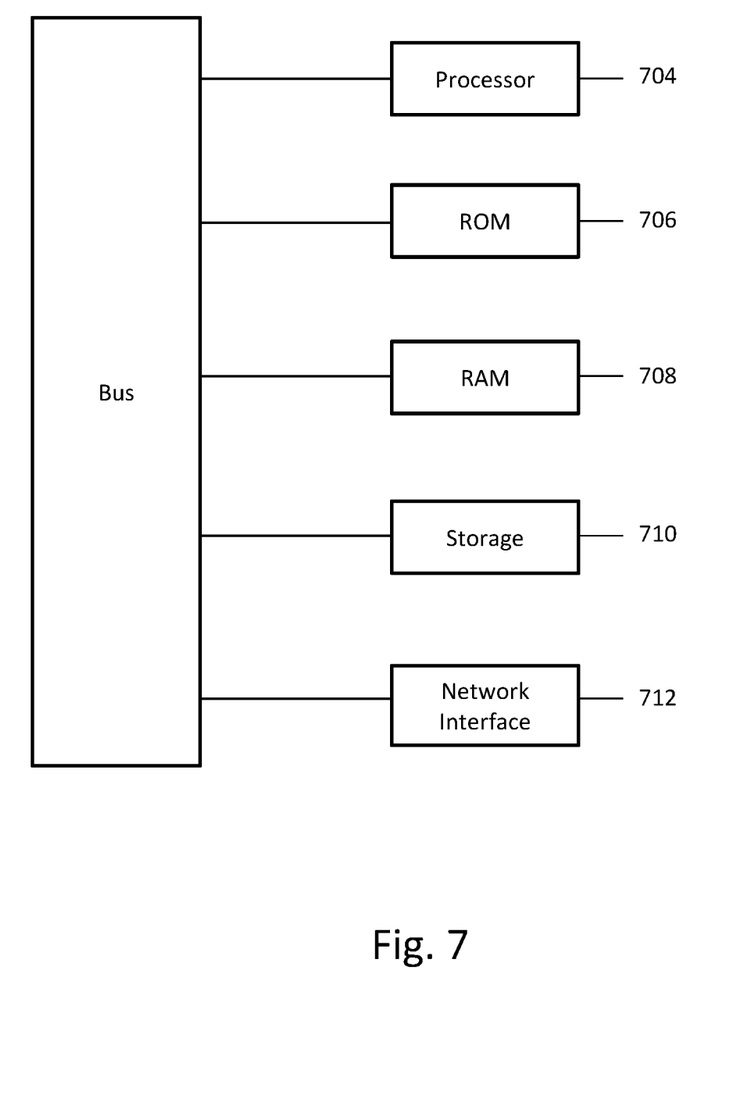
FIG. 7 is a block diagram of a processing system according to one embodiment.

FIG. 7 is a block diagram of a processing system according to one embodiment. The processing can be used to implement the protocols, systems and nodes described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for encrypting and aggregating data in a network, the method comprising:
   performing synchronization, by a leader node, comprising the following steps:
      transmitting a prepare message, including a proposal number, the prepare message encrypted with a proposal key and signed by the leader node;
      receiving a promise message including the proposal number, an initiated instruction number, and a last accepted proposal if any from each follower node, the promise message encrypted with authenticated encryption;
      transmitting an accept message including the proposal number, the initiated instruction number, and the last accepted proposal, the accept message encrypted with the proposal key and signed by the leader node; and
      receiving an accepted message including a hash of the proposal number and the instruction number and an acknowledgement indicator encrypted with additive homomorphic cryptography; and
   performing a steady state phase, by the leader node, comprising the following steps:
      transmitting a second accept message including the synchronized proposal number, a second incremented instruction number, and a transaction value from the request, the second accept message encrypted with the proposal key and signed by the leader node; and
      receiving a second accepted message including a hash of the synchronized proposal number, the second instruction number and an acknowledgment indicator encrypted with additive homomorphic cryptography.

2. The method according to claim 1, wherein the leader node is connected to a plurality of follower nodes in a tree topology.

3. The method according to claim 1, wherein the leader node is connected to a plurality of follower nodes in a star topology.

4. The method according to claim 1, further comprising sending, by a follower node, the promise message.

5. The method according to claim 1, further comprising:
   receiving, by a first follower node, a sub-accepted message from a second follower node;
   computing a message authentication code for the sub-accepted message and adding an acknowledgement indicator from the sub-acceptance message to an acknowledgement indicator for the first follower node.

6. The method according to claim 1, wherein the network is a blockchain network.

7. The method according to claim 1, further comprising storing, by the leader node, credentials for a plurality of follower nodes.

8. The method according to claim 1, wherein the leader node includes a counter to track instruction numbers.

9. A leader node, in a network, the leader node comprising one or more processors and a non-transitory computer readable memory storing instructions, such that when the instructions are executed by the one or more processors the following steps are carried out:
   performing synchronization, by the leader node, comprising the following steps:
      transmitting a prepare message, including a proposal number, the prepare message encrypted with a proposal key and signed by the leader node;
      receiving a promise message including the proposal number, an initiated instruction number, and a last accepted proposal if any from each follower node, the promise message encrypted with authenticated encryption;
      transmitting an accept message including the proposal number, the initiated instruction number, and the last accepted proposal if any from each follower node, the accept message encrypted with the proposal key and signed by the leader node; and
   receiving an accepted message including a hash of the proposal number and the instruction number and an acknowledgement indicator encrypted with additive homomorphic cryptography; and
   performing a steady state phase comprising the following steps:
      transmitting a second accept message including the synchronized proposal number, a second incremented instruction number, and a transaction value from the request, the second accept message encrypted with the proposal key and signed by the leader node; and
      receiving a second accepted message including a hash of the synchronized proposal number, the second instruction number and an acknowledgment indicator encrypted with additive homomorphic cryptography.

10. The leader node according to claim 9, further storing instructions for storing credentials for a plurality of follower nodes.

11. The leader node according to claim 9, further storing instructions for counting instruction numbers.

12. The leader node according to claim 9, wherein the leader node is connected to a plurality of follower nodes in a tree topology.

13. The leader node according to claim 9, wherein the leader node is connected to a plurality of follower nodes in a star topology.

14. The leader node according to claim 9, further storing instructions for receiving a promise message sent by a follower node.

15. The leader node according to claim 9, wherein the network is a blockchain network.

\* \* \* \* \*